(12) United States Patent
Stupp

(10) Patent No.: US 12,085,111 B2
(45) Date of Patent: Sep. 10, 2024

(54) THREADED SMA/SMP BULKHEAD ACCESSORY FOR TETHERED CAPS

(71) Applicant: SRC, Inc., North Syracuse, NY (US)

(72) Inventor: Andrew H. Stupp, Syracuse, NY (US)

(73) Assignee: SRC, Inc., North Syracuse, NY (US)

( * ) Notice: Subject to any disclaimer, the term of this patent is extended or adjusted under 35 U.S.C. 154(b) by 165 days.

(21) Appl. No.: 16/875,387

(22) Filed: May 15, 2020

(65) Prior Publication Data

US 2021/0355985 A1    Nov. 18, 2021

(51) Int. Cl.
*F16B 41/00*    (2006.01)

(52) U.S. Cl.
CPC .................................. *F16B 41/002* (2013.01)

(58) Field of Classification Search
CPC ..................................................... F16B 41/002
USPC .......................................................... 24/298
See application file for complete search history.

(56) References Cited

U.S. PATENT DOCUMENTS

| 2,324,175 | A | * | 7/1943 | Simms | .................. | F16B 41/002 |
| | | | | | | 411/533 |
| 5,102,003 | A | * | 4/1992 | Oswald | .............. | F01M 11/0408 |
| | | | | | | 220/230 |
| 6,220,562 | B1 | * | 4/2001 | Konkle | .................. | A47B 97/00 |
| | | | | | | 248/500 |
| 8,292,101 | B1 | * | 10/2012 | Bragg | ................ | B65D 47/0838 |
| | | | | | | 220/254.5 |
| 2012/0152201 | A1 | * | 6/2012 | Salameh | ............... | F16B 5/0664 |
| | | | | | | 123/198 E |

* cited by examiner

*Primary Examiner* — Lindsay M Low
*Assistant Examiner* — Omar Morales
(74) *Attorney, Agent, or Firm* — David L. Nocilly; Bond Schoeneck & King PLLC

(57) ABSTRACT

An accessory for tethering a cap for a SMA/SMP bulkhead to a device assembly without having to introduce elements that could compromise the integrity of the device assembly. The accessory includes a first portion that engages the SMA/SMP bulkhead and securely interconnects thereto, and a second portion that includes an opening where a tether chain is physically interconnected thereto. The tether chain includes the cap for the SMA/SMP bulkhead secured to the second end thereof.

6 Claims, 5 Drawing Sheets

… (1)

THREADED SMA/SMP BULKHEAD ACCESSORY FOR TETHERED CAPS

GOVERNMENT FUNDING

This invention was made with Government support under Contract No. W15QKN-14-9-1001 awarded by the Research Development and Engineering Command. The United States Government has certain rights in the invention.

FIELD OF THE INVENTION

The present disclosure is directed generally to SMA accessories for threaded caps.

BACKGROUND

SMA/SMP bulkheads are commonly used on RF communication assemblies, such as, for example, software defined radios (SDRs). Due to the sensitivity of the communications signals handled by the assemblies, there is a need to prevent dust, moisture, or other contaminants from infiltrating the assembly via the SMA/SMP bulkheads. Thus, caps are typically positioned in covering relation to the SMA/SMP bulkheads to protect them from foreign contaminants.

To ensure integrity of the caps and to ease the maintenance and repair tasks, the SMA/SMP bulkhead caps are often tethered to the assembly to prevent them from falling free. The common manners of tethering the cap to the assembly is via a ring or a screw. The ring would mount under the bulkhead to provide a capture point, while a tethered chain can be used and screwed into the assembly to retain its tethered connection.

While mounting rings and screwed on tether chains are both functional, the screw introduces an opening into the assembly where moisture could seep through. It is possible to minimize the amount of moisture through use of sealing hardware, but such hardware does break down over time leaving the assembly susceptible to moisture damage. With the mounting rings, those too require a gasket to prevent any moisture infiltration, and those gaskets also fail over time.

Accordingly, there is a need in the art for an accessory that tethers an SMA/SMP bulkhead cap to an assembly that minimizes risks for moisture, dust and other contaminant infiltration.

SUMMARY

The present disclosure is directed to a threaded SMA/SMP bulkhead accessory for threaded caps.

According to an aspect is an accessory for tethering a cap for a SMA/SMP bulkhead to a device, the SMA/SMP bulkhead having external threads of a first diameter and a stem that extends upwardly from the device to the external threads of a second diameter smaller than the first diameter, the accessory comprising a SMA/SMP connection portion that extends in a first plane and comprises a first opening formed therethrough that is adapted to operably engage the external threads on the SMA/SMP bulkhead; a second portion that extends in a second plane that intersects the first plane at a predetermined angle that is less than 180 degrees, the second portion comprising a second opening formed therethrough; and a chain having a first end that is securely fastened to the second portion and a second end to which the cap is securely connected, whereby the cap may be attached in covering relation to the SMA/SMP bulkhead or removed therefrom and left tethered to the device.

According to an embodiment, the accessory is composed of a stainless steel.

According to an embodiment, the predetermined angle is external and 15 degrees.

According to an embodiment, the first opening is internally tapped.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which.

DETAILED DESCRIPTION OF EMBODIMENTS

The present disclosure describes an accessory 10 for tethering a cap 12 for a SMA/SMP bulkhead 14 to device assembly 16, such as an SDR.

Figure 1:
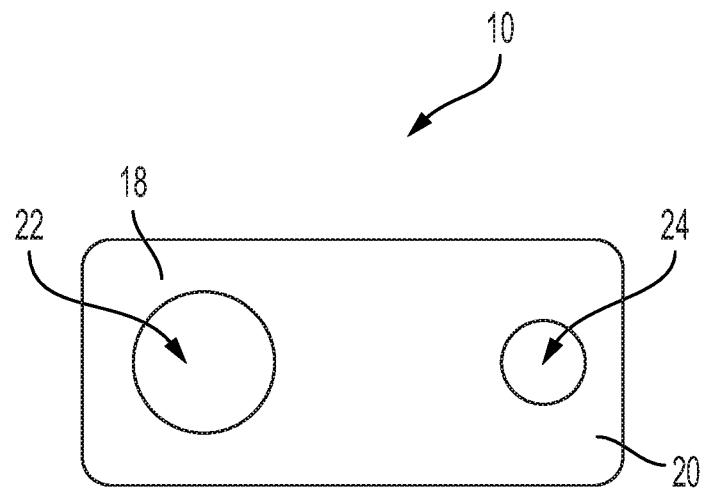
FIG. 1 is a perspective view of an accessory that tethers an SMA/SMP bulkhead cap to an RF assembly, in accordance with an embodiment.
Figure 2:
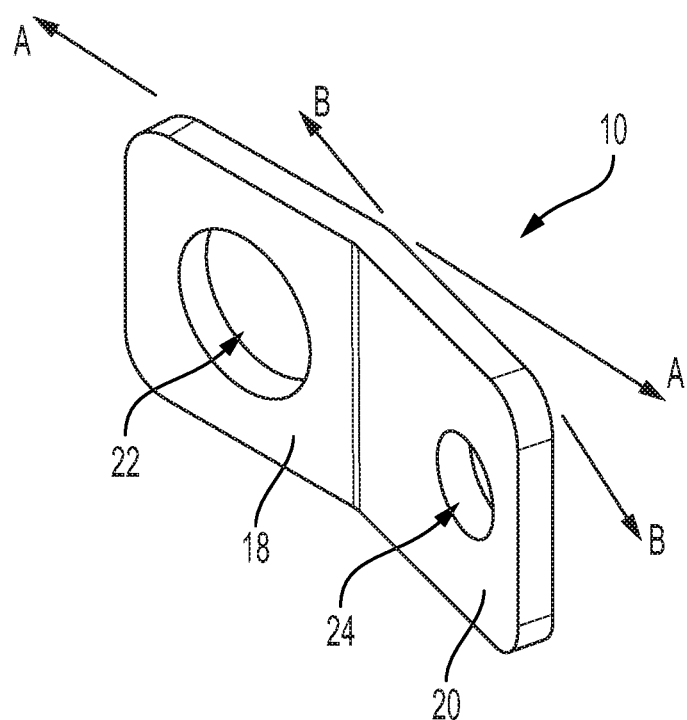
FIG. 2 is a top plan view of an accessory that tethers an SMA/SMP bulkhead cap to an RF assembly, in accordance with an embodiment.
Figure 3:
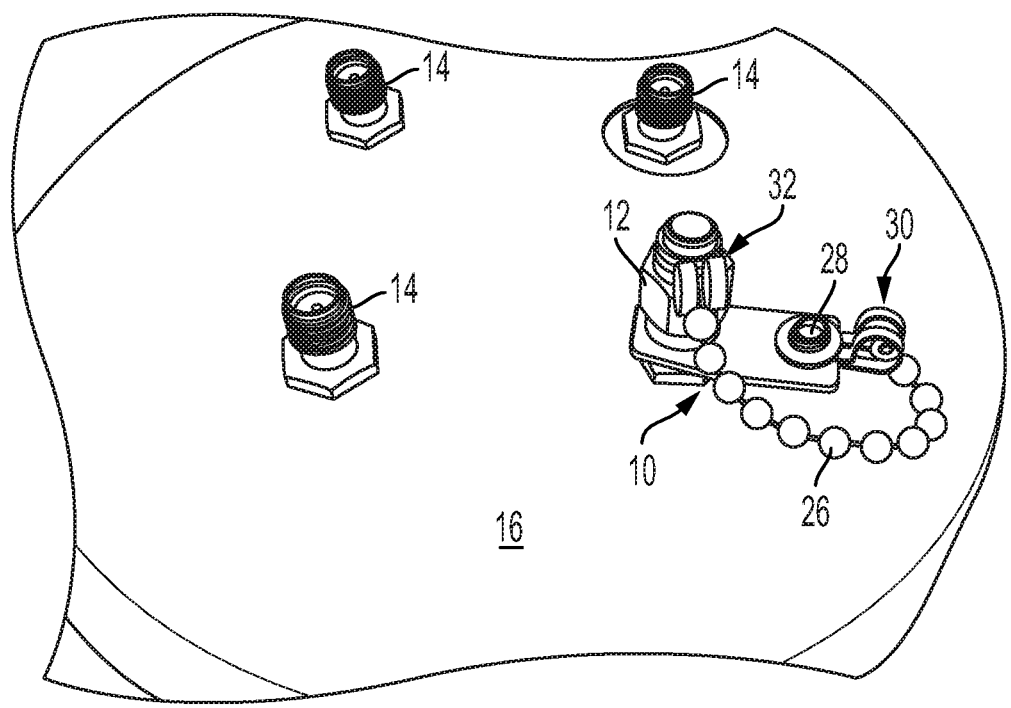
FIG. 3 is a perspective view of an accessory shown in use tethering an SMA/SMP bulkhead cap to an RF assembly, in accordance with an embodiment.
Figure 4:
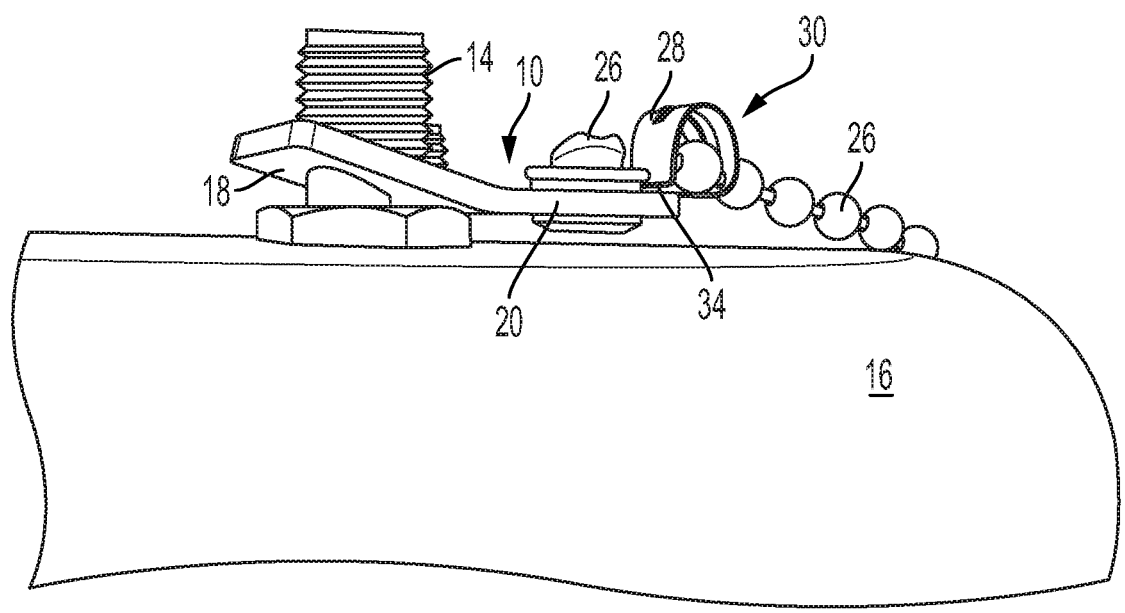
FIG. 4 is an enlarged perspective view of an accessory shown in use tethering an SMA/SMP bulkhead cap to an RF assembly, in accordance with an embodiment.
Figure 5:
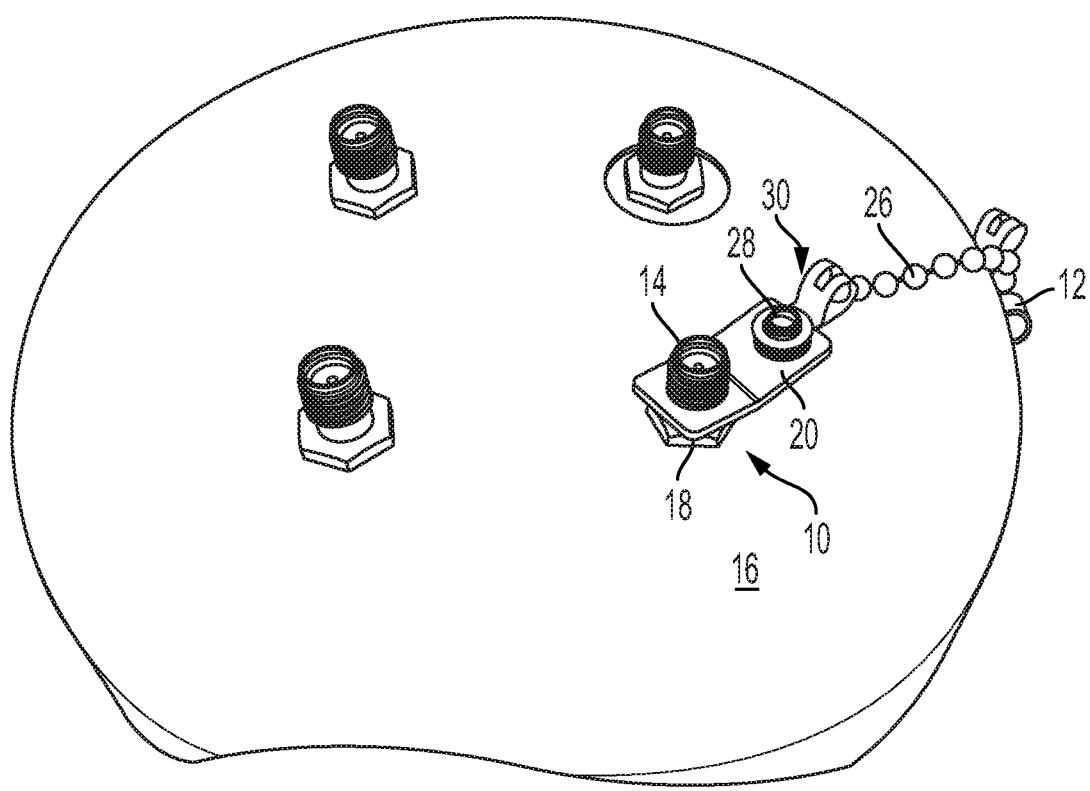
FIG. 5 is a perspective view of an accessory shown in use tethering an SMA/SMP bulkhead cap to an RF assembly, in accordance with an embodiment.
Figure 6:
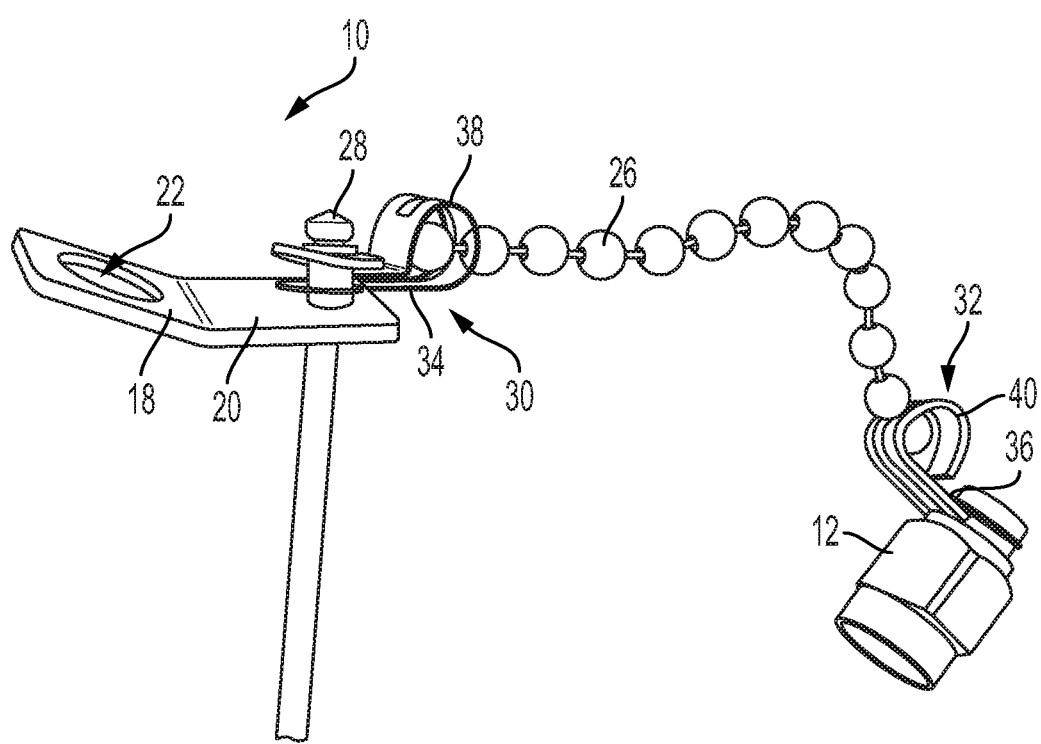
FIG. 6 is a perspective view of an accessory for tethering an SMA/SMP bulkhead cap to an RF assembly, in accordance with an embodiment.

Referring to FIG. 1, in one embodiment, is accessory 10 comprising a first portion 18 that extends in a first plane A-A, and a second portion 20 that extends in a second plane B-B that intersects plane A-A at an angle of about 15 degrees, although that angle could vary reasonably +/−5 degrees (within a range of 10-20 degrees), the important aspect of the angle being to provide a user with suitable space to attach the tether without having to contact device assembly 16. A tapped opening 22 is formed through the first portion 18 with a thread pitch that matches that of the SMA/SMP bulkhead, as will be described in greater detail hereinafter. Tapped opening 22 permits accessory 10 to be screwed onto SMA/SMP bulkhead 14 where it will be securely anchored to device assembly 16. A second opening 24 is formed through second portion 20 and permits a tether chain 26 to be securely interconnected thereto via a yoke assembly 26 that is attached via a rivet 28 or other fastener connection to second portion 20.

Tether chain 26 is conventional and has its first end fastened to second portion 20 via a yoke assembly 26 (which is fastened to second portion 20 via rivet 28 as described above,) and a second end that is secured in a second yoke assembly 30 to which cap 12 is securely fastened. Yoke assemblies 30 and 32 each include a flat portion 34, 36, respectively, and a yoke 38, 40, respectively. Flat portions 30 and 32 are attached to second portion 20 and cap 12, respectively, while the first and second ends of the chain 26 are retained in the yokes 38, 40, respectively.

Device assembly 16, in one example, can be an SDR that includes four sets of SMA/SMP bulkheads 14 thereon. Th SMA/SMP bulkheads 16 each comprise an externally threaded end portion 42 and an unthreaded neck 44 that extends upwardly from assembly 16 to the threaded end portion 42. The threaded end portion is of a pitch diameter that matches the internal thread diameter of tapped opening 22 and is slightly greater in diameter than the diameter of unthreaded neck 44. Thus, once accessory 10 is threaded onto SMA/SMP bulkhead 16, it can remain loosely secured around unthreaded neck 44 and not come loose absent someone purposefully unthreading it.

The caps 12 used to cover SMA/SMP bulkheads 14 protect them from moisture, dust, and other foreign contaminants that could adversely impact the performance of the device assembly 16. Thus, it is important that the covers 12 always be used and it is helpful to have them tethered to the assembly 16. However, it is detrimental to incorporate elements into the tether that could lead to moisture or other contaminant infiltration, and the present invention provides an accessory that will securely tether the cap 12 to the assembly 16 without introducing any elements that could adversely effect performance of the assembly 16.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. An accessory for tethering a cap for a SMA/SMP bulkhead to a device, comprising:
   a first portion that extends in a first plane and comprises a first opening formed therethrough that is tapped and dimensioned to operably engage and be fully threaded onto any external threads on a SMA/SMP bulkhead so that the first portion is loosely secured around a neck of SMA/SMP bulkhead that supports the external threads;
   a second portion that extends in a second plane that intersects the first plane at a predetermined angle that is less than 180 degrees, the second portion comprising a second opening formed therethrough; and
   a chain having a first end that is securely fastened to the second portion and a second end to which the cap is securely connected, whereby the cap may be attached in covering relation to the external threads of the SMA/SMP bulkhead or removed therefrom and left tethered to the device.

2. The accessory according to claim 1, wherein the accessory is composed of a stainless steel.

3. The accessory according to claim 1, wherein the predetermined angle is external and 15 degrees.

4. The device assembly according to claim 1, wherein the accessory is composed of a stainless steel.

5. The device assembly according to claim 1, wherein the predetermined angle is external and 15 degrees.

6. A device assembly, comprising:
   a bulkhead having an unthreaded neck that extends upwardly to a threaded end portion;
   a cap attached over the threaded end portion of the bulkhead; and
   an accessory coupled to the unthreaded neck of the bulkhead and tethered to the cap by a chain;
   wherein the accessory has a first portion that extends in a first plane and a first opening formed through the first portion that is tapped and dimensioned to operably engage and be fully threaded onto and past the threaded end portion of the bulkhead to be loosely secured around the unthreaded neck the bulkhead;
   wherein the accessory has a second portion that extends in a second plane that intersects the first plane of the first portion at a predetermined angle that is less than 180 degrees and has a second opening formed therethrough;
   wherein the chain has a first end that is securely fastened to the second opening of the second portion and a second end that is securely connected to the cap.

\* \* \* \* \*